(No Model.)
O. B. SHALLENBERGER.
ELECTRIC CUT-OUT.
No. 357,293. Patented Feb. 8, 1887.
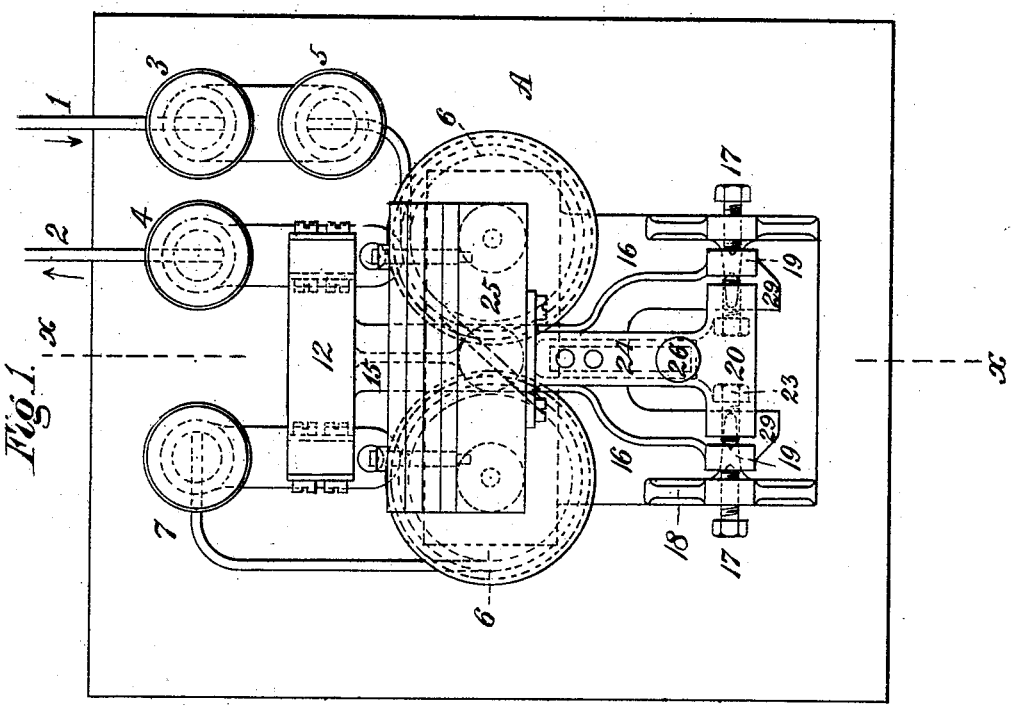
Fig. 1.
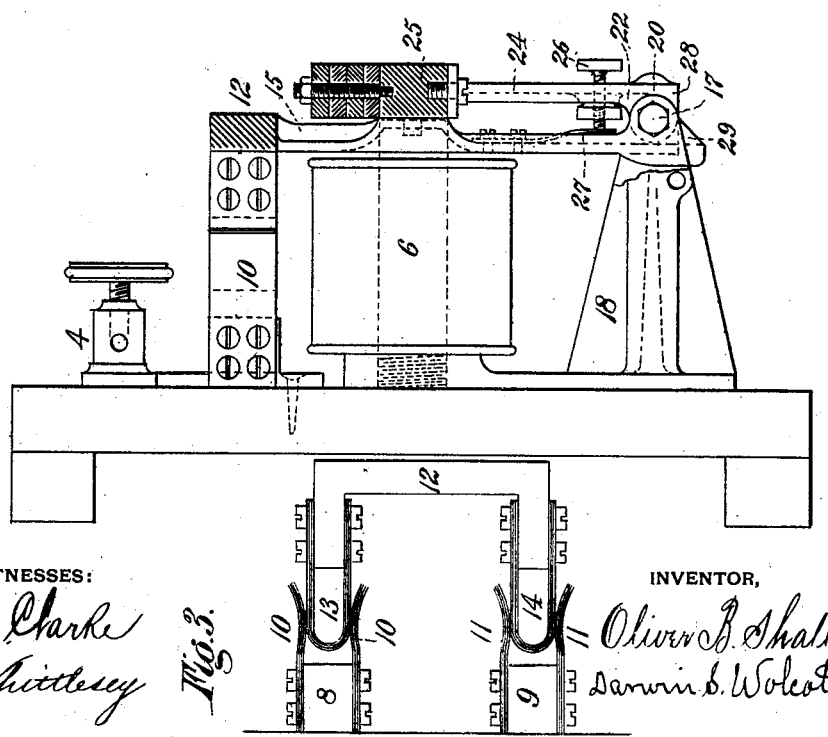
Fig. 2.
Fig. 3.
WITNESSES:
C. M. Clarke
R. H. Whittlesey
INVENTOR,
Oliver B. Shallenberger.
Darwin S. Wolcott
Att'y.

UNITED STATES PATENT OFFICE.

OLIVER B. SHALLENBERGER, OF ROCHESTER, PENNSYLVANIA.

ELECTRIC CUT-OUT.

SPECIFICATION forming part of Letters Patent No. 357,293, dated February 8, 1887.

Application filed September 1, 1886. Serial No. 212,319. (No model.)

*To all whom it may concern:*

Be it known that I, OLIVER B. SHALLENBERGER, residing at Rochester, in the county of Beaver and State of Pennsylvania, a citizen of the United States, have invented or discovered certain new and useful Improvements in Electric Cut-Outs, of which improvements the following is a specification.

In the accompanying drawings, which make part of this specification, Figure 1 is a view in front elevation of my improved electrical cut-out. Fig. 2 is a sectional view of the same on the line $x\ x$, Fig. 1. Fig. 3 is a detail view of the spring contact device.

In electro-metallurgy, and in charging secondary batteries, it frequently occurs that the counter electro-motive force of the bath or battery is sufficient, either through a decrease of the speed of the generator, a lack of a proper regulation of the electro-motive force of the generator, or other causes, to overcome the electro-motive force of the generator, and thereby cause a reversal of the currents through the circuit. It has heretofore been attempted to prevent such a reversal by breaking the circuit by mechanism operative on a reduction of the speed of the generator or the engine driving the same; but such devices are necessarily inoperative if connected to the driving-engine, when the slowing of the generator is consequent upon a slipping of the belt, or if connected to the generator such mechanism will not operate to break the circuit when the electro-motive force of the generator is changed by means of the current-regulator, as in such case the speed of the generator is not altered. The object of the invention herein is to provide a suitable mechanism operative upon a close approximation of the counter electro-motive force of the translating device to the electro-motive force of the generator to break the circuit, and thereby prevent a reversal of the current imminent from such an approximation; and it is a further object of the invention herein to so construct such cut-out mechanism as to operate in a quick positive manner, and thereby prevent the formation of an arc between adjacent parts of the cut-out mechanism, and their consequent destruction.

To these ends the invention consists, in general terms, in the construction and combination of parts, substantially as hereinafter more fully described and claimed.

In carrying out my invention, the conductors 1 and 2, leading from a suitable generator, (not shown,) are connected to a suitable board, A. (See Fig. 1.) To the binding-post 3, or to a binding-post, 5, in electric connection with the post 3, is connected one end of the wire helix passing around a suitable iron core, and forming, in connection therewith, the electro-magnets 6, secured in any suitable manner to the board A, the opposite end of said helix being attached to the binding-post 7. To the binding-posts 4 and 7 are electrically connected the blocks 8 and 9, to the sides of which are attached the double spring contact-plates 10 and 11.

In order to complete the circuit from the generator through the coils of the electro-magnet and any translating device included in said circuit, it is necessary to connect the spring contact-plates 10 and 11. This connection is effected by the bar 12, provided at its ends with the spring-loops 13 and 14, constructed to engage each of the double spring contact-plates 10 and 11. This bar 12 is attached to the upper end of the stem 15, provided at its lower end with the arms 16, which are supported in pivot-pins 17, passing through the brackets 18, secured to the board A below the magnets and engaging by their conical ends correspondingly-shaped holes in lugs 19, formed on and projecting from the front side of the arms 16. This construction permits of the bar 12 being swung in a vertical plane toward or away from the contact-plates 10 and 11.

Between the lugs 19 of the arms 16 is pivotally supported the cross-head 20, provided with inwardly-projecting lugs 22, through which pass the pivot-pins 23, engaging by their conical points correspondingly-shaped holes in the inner sides of the lugs 19. To the cross-head 20 is secured the upwardly-projecting stem 24, carrying the metal block 25 at its upper end, said block being the armature of the magnets 6. The pivotal points of the cross-head carrying the armature are arranged in approximately the same vertical plane as the inner face of said armature, so that the weight of the armature will have a constant tendency to turn the cross-head on its pivotal points and allow the armature to drop away from the magnets when no current is flowing through the circuit in which said magnets are placed; but as it is desirable to move the armature from the magnets while there is a small amount of current flowing therethrough a set-screw, 26, is passed through the stem 24, said screw bearing at its end against a spring, 27, secured to the stem 15. By adjusting the spring and set-screw the armature can be forced away from the magnets while a current of considerable amount is passing through the circuit of the magnets.

The operation of my improved cut-out is as follows: When it is desired to complete the circuit in the cut-out, the bar 12 is turned up to force the loops 13 and 14 between the double spring contact-plates 10 and 11. This completes the circuit. The armature 25 is then turned up against the magnets 6, which are then operative, as the circuit is complete. These magnets hold the bar 12 in place through the medium of the set-screw 26 and spring 27, these latter being adjusted so as to be operative to force the armature outward when the amount of current passing the circuit from the generator decreases consequent upon a lowering of the electro-motive force of said current to a point nearly equal to the counter electro-motive force in the translating device to which the current is being supplied. As long as the current remains normal, or at a point above that at which the spring is adjusted to act, the armature and bar 12 will be held in position; but as soon as the current falls to or below the point at which the spring will act the armature will be forced away from the magnets by said spring, and as it drops, turning the cross-head 20 on its pivot-points, it will cause the squared shoulder 28 of said cross-head (see Fig. 2) to strike with considerable force on the part 29 of the arms 16, projecting below the pivotal points of said arms, and thereby turning said arms on said pivot-points will quickly and forcibly draw the loops from between the contact-plates 10 and 11. The block or armature 25 is made comparatively heavy, in order that it may in dropping impart a sharp quick blow to the lower part of the arms 16, and thereby effect a sudden and positive release of the loops from the contact-plates.

In case the armature 25 is not sufficiently heavy to strike the arms 16 with the force necessary to effect a sudden breaking of the circuits, blocks or plates 30 may be attached to said armature, as clearly shown in Fig. 2.

As other means may be employed for completing the circuit, and as motion may be imparted from the armature to the circuit-closing device by any suitable means, I do not wish to be understood as limiting myself to the exact construction shown and described.

It will be noticed as the principal characteristic of the invention herein that the circuit is broken through a diminution in amount of current passing and a consequent drop in the electro-motive force of the current, and not by a diminution of the power of motion of the mechanism used for generating such current.

I claim herein as my invention—

1. In an electric cut-out, the combination of an electric circuit, contact plates or points connected with the ends of said circuit, a switch or circuit-closer for connecting said contact plates or points, and a weight arranged to be released by a decrease in the current passing through the main circuit, and in its movement to strike the switch or circuit-closer, and thereby effect a quick movement of the switch or circuit-closer away from the contact-plates, substantially as set forth.

2. In an electric cut-out, the combination of an electric circuit, contact plates or points connected with the ends of said circuit, a switch for connecting the contact-points attached to a swinging arm, electro-magnets included in said circuit, and an armature mounted on a swinging arm and adapted when released by the magnets to move the switch out of connection with the contact-points, substantially as set forth.

In testimony whereof I have hereunto set my hand.

OLIVER B. SHALLENBERGER.

Witnesses:
DARWIN S. WOLCOTT,
R. H. WHITTLESEY.